United States Patent

[11] 3,597,750

[72] Inventors Russell K. Brunner Morgan Hill; Timothy W. Martin, San Jose; Charles R. Wilford, San Jose, all of, Calif.

[21] Appl. No. 792,343

[22] Filed Jan. 21, 1969

[45] Patented Aug. 3, 1971

[73] Assignee Information Storage Systems, Inc. Cupertino, Calif.

[54] SERVO WITH AGC FOR POSITIONING A MAGNETIC HEAD

6 Claims, 5 Drawing Figs.

[52] U.S. Cl. ........ 340/174.1 C

[51] Int. Cl. ........ G11b 5/56, G11b 21/10

[50] Field of Search ........ 340/174.1 B, 174.1 C

[56] References Cited

UNITED STATES PATENTS

| | | | |
|---|---|---|---|
| 3,362,021 | 1/1968 | Ma et al. | 340/174.1 |
| 3,404,392 | 10/1968 | Sordello | 340/174.1 |

*Primary Examiner*—Bernard Konick
*Assistant Examiner*—Vincent P. Canney
*Attorney*—Robert B. Crouch

ABSTRACT: Apparatus for maintaining an array of read/write heads in position at a given track location on a stack of rotating discs, including: a photoelectric transducer for producing two alternating signals of 180° phase relationship, actuator control circuitry for servoing the array onto the signals and AGC circuitry for comparing the two signals and generating error signals to adjust the gains and amplitudes of the signals.

INVENTORS
Russell K. Brunner
Timothy W Martin
Charles R. Wilford
BY
Robert B. Crouch

SERVO WITH AGC FOR POSITIONING A MAGNETIC HEAD

BACKGROUND

In direct access data storage devices of the type that use a stack of rotating disks as the recording medium, the data is usually recorded in concentric tracks on both surfaces of the disks. The tracks are separated from each other and are recorded at densities of approximately 100 per inch. To gain access to a given record or segment of data requires that the read/write heads be moved to the particular track in which the desired data is recorded and then held firmly in position at that track location while the data is read and/or updated. The requirement for rapid movement of the heads from one track to another in a random fashion is difficult to effectuate because of the precision with which the heads must be positioned. This requirement is complicated in contemporary storage devices by the use of packs of disks which are interchangeable among a series of devices or drives. Such devices escalate the accuracy requirement by the introduction of the necessity that data written on one device must be capable of being read and updated on a sequence of other drives.

The process of positioning an array of read/write heads at a selected track is usually accomplished in two steps; i.e., coarse positioning to move the array into proximity with the selected track and then fine positioning to locate the read/write heads directly over the track location and hold them in the proper position during the read/write process. The coarse positioning has usually been accomplished by some type of linear actuator operating with a closed or open loop control. The fine positioning has been carried out by a mechanical detent or by means of servo signals recorded on one or more of the disk surfaces. A detent mechanism usually involves a detent tooth which seats in a groove in a rack associated with the head support carriage. Such a mechanism is inherently slow and is subject to wear. The overall access time of the device; i.e., the average time required to move the read/write heads from one track location to another is increased by the slow speed of the detent and by the settling time required to dampen out oscillations generated by the impact of the detent tooth on the rack. In addition, the high forces applied to the detent cause wear of the tooth and rack with consequent loss of accuracy and reliability. The recorded servo signals may occupy one entire disk surface or may be interspersed with the data on each surface. Either approach results in a significant reduction in data storage capacity due to the space which must be allocated to the servo signals. Furthermore, there is an increase in cost since one or more additional read heads are required to read the servo patterns.

INVENTION

The present invention avoids the shortcomings of the prior art devices by provision of nonimpact apparatus for maintaining an array of read/write heads in position over a selected track on a rotating disk stack and which allows the entire surface area of the disk stack to be used for the storage of data. This is accomplished in the present invention by provision of a closed loop system for positioning the head array, including a transducer for producing a continuous signal indicative of instantaneous position of the array and means for servoing the heads onto the signal, the means including means for continuously monitoring the signal to maintain a constant ratio of signal strength to increment of head displacement.

Objects and many of the attendant advantages of this invention will be readily understood by reference to the following detailed description of embodiments of the invention as illustrated in the accompanying drawings wherein.

Figure 1:
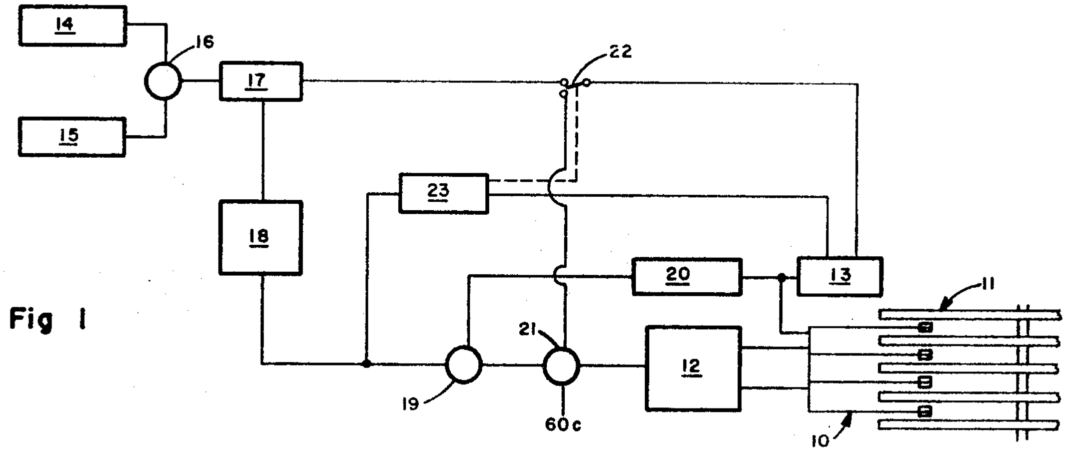
FIG. 1 is a schematic view of an access mechanism with control circuitry.

FIG. 1 is a schematic view of apparatus for positioning an array of read/write heads 10 relative to a stack of disks 11 which includes a linear motor 12, a transducer 13 and circuitry for controlling the position of the motor. Data is recorded on both the upper and lower surfaces of the disks in circular concentric tracks, each of which is identified by an address. The circuitry is illustrated as including two address registers 14 and 15 which contain the present address; i.e., the address of the track over which the head array presently is positioned, and the desired address; i.e., the address of the track to which it is desired to move the heads. The registers are connected through a summing junction 16 to a difference counter 17 which is set to a number which equals the numerical difference between the two addresses in the registers. The output from the counter is connected through a DAC (Digital to Analog Converter) shaper 18 to a summing junction 19. In the summing junction, the position signal from the shaper is combined with a velocity signal from a tachometer 20 and the resultant signal is applied through another summing junction 21 to the motor 12 to control the direction and extent of movement of the head array. As illustrated, the output of the transducer 13 is connected to the counter 17 through a switch 22, the position of which is controlled by a signal from a detector 23. The detector, which is connected between the shaper and the transducer, can be any suitable level detection circuit, such as a Schmitt trigger.

Figure 2:
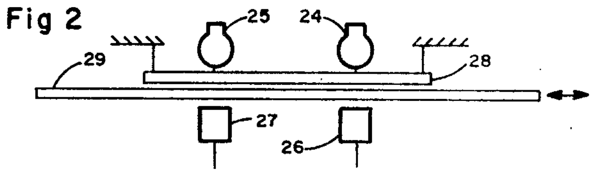
FIG. 2 is a plan view at an enlarged scale of the transducer of FIG. 1.
Figure 3:
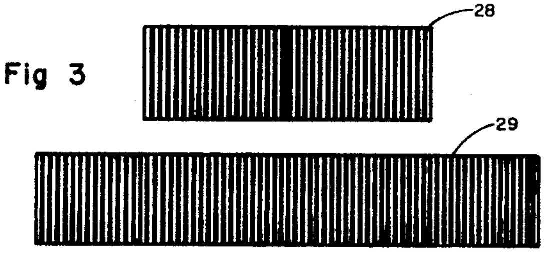
FIG. 3 is a plan view of the optical gratings of FIG. 2.

The transducer, as illustrated in FIG. 2, includes a pair of light sources 24 and 25 mounted closely adjacent a portion of a carriage which supports the head array. Such a mounting is illustrated in copending application Ser. No. 792,454 in the name of S. F. Brown. A pair of photoelectric sensors 26 and 27 are mounted in spaced relation with, and in position to receive light from, the light sources. Two optical gratings 28 and 29 are positioned between the light sources and sensors as shown. The grating 28 is mounted in fixed relation with the light sources and sensors while the grating 29 is connected to the carriage and supported for movement along its longitudinal axis. The movable grating 29 is supported closely adjacent the fixed grating 28 with as little space between the two as is practicable. The gratings are each formed of a dimensionally stable, translucent material such as glass, etc. with a sequence of closely spaced, parallel lines on one surface. The lines are separated by clear spaces, so that the pattern on each grating consists of alternate opaque and translucent areas of approximately equal width. The opaque lines are applied to the translucent material by any of a variety of suitable processes, such as plating, etching, printing, photographing, etc. The dimensions of the opaque and translucent areas of both gratings are complementary to provide a shutter effect and prevent transmission of the light from the light sources to the sensors when the lines on one grating are superimposed on the spaces of the other, and vice versa. As shown in FIG. 3 the pattern of alternating opaque and translucent areas is continuous across the entire length of the movable grating while the pattern on the fixed grating is in two sections, each of which is continuous over half of the grating, but which are reversed from each other. The result is that when one-half of the fixed grating is blocked by the movable grating, the other half of the fixed grating is open to transmit light.

Figure 4:
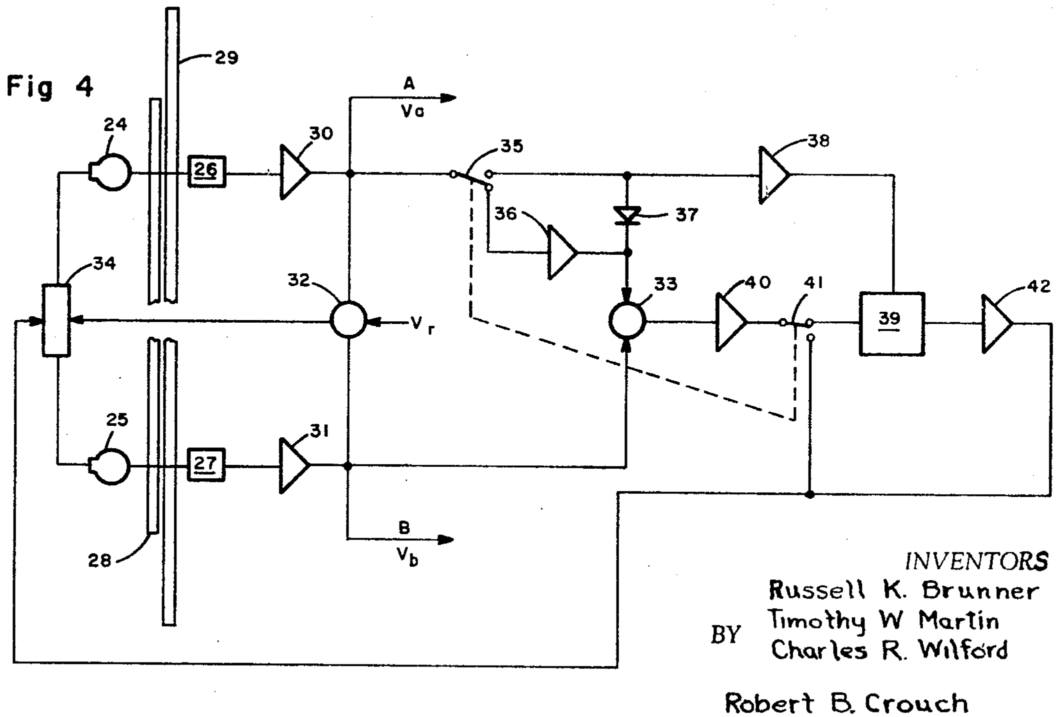
FIG. 4 is a schematic view of the AGC circuitry for monitoring the signals from the transducer.

The circuitry of FIG. 4 illustrates a means for monitoring the signals derived from the transducer. Light passed through the gratings is received by the photoelectric sensors 26 and 27 and converted into two alternating electrical signals which are amplified in operational amplifiers 30 and 31. The signals emitted by the sensors will vary depending upon the condition of the access mechanism; i.e., whether the mechanism is in the seek condition or the on-track condition. In the seek condition; i.e., while the motor is moving the head array from one track to another, the signals appear as waveforms A and B of FIG. 5—1, while in the on-track condition; i.e., when the array is positioned over the selected track, the signals appear as $V_a$, FIG. 5-2, and $V_b$, FIG. 5-3. In both conditions the amplitudes of the two signals, A and B or $V_a$ and $V_b$, are summed in a summing junction 32, the output of which controls a current source 34. In the seek condition the two signals A and B are gain compared in a summing junction 33 and are also combined and applied to the counter 17. In the on-track condition the signals $V_a$ and $V_b$ are combined and applied to summing junction 21 and are also summed differentially in summing junction 33 and then demodulated. While seeking, signal A is applied through a switch 35 and an inverter 36 to junction 33. The output of junction 33 is passed through an operational amplifier 40 and a switch 41 to the current source 34. While on track, signal $V_a$ is applied through a diode 37 to junction 33 and through an overdriven amplifier 38 to a demodulator 39. The output from junction 33 is passed through amplifier 40 and switch 41 to the demodulator while the output from the demodulator is directed through an operational amplifier 42 to the current source.

In the operation of the present invention, light is transmitted through the gratings to the sensors as the movable grating is moved along with the carriage. Since the patterns on the two halves of the fixed gratings are reversed from each other, light is transmitted alternately through the two halves to first one sensor and then to the other. Accordingly, as illustrated at A and B in FIG. 5-1, the output from each sensor is an alternating voltage signal and the two signals are of the same frequency but 180° out of phase with each other. Since the voltages A and B are used to control the movement of the motor and position the read/write heads on track, it is necessary that the signals themselves provide an accurate indication of the movement of the carriage. Therefore, the effects of drift, variations in power, etc. on the signals must be precluded in order to avoid the effect of variations in circuit component characteristics. The amplitude and the gain of both voltages are constantly monitored. This is carried out by maintaining two relationships; i.e., $A+B=V_r$ and $A_{gain}$. In the circuitry of FIG. 4, voltages A & B and $V_a$ & $V_b$ are applied to the summing junction 32 along with a reference voltage $V_r$. Voltages *A* & *B* or $V_a$ & $V_b$ are added and the sum is compared with $V_r$ to produce an error signal which is transmitted to the current source 34. Adjustment of the signal source in response to the error signal insures that the proper current is applied to the light sources 24 and 25 in order to maintain a constant combined voltage output from the sensors 26 and 27. During the seek condition, switches 35 and 41, which are ganged together, are both in the down position. In this position, voltage B is applied directly to summing junction 33. Voltage A is inverted by inverter 36 and then applied to the summing junction. The algebraic difference between the two signals is then amplified in amplifier 40 and fed back through switch 41 to source 34 to apportion the previous error signal from summing junction 32 between the two light sources to vary the intensity of light from the two sources and maintain the gain of signal A equal to that of signal B.

Figure 5:
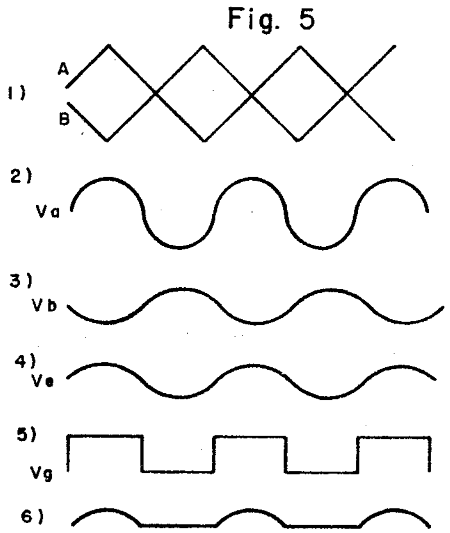
FIG. 5 illustrates a series of waveforms produced at various points in the circuitry of FIG. 4.

The voltage signals A and B are combined as shown in FIG. 5-1 and transmitted to the difference counter. The difference counter is decremented on the occurrence of each intersection between signals A and B and emits a digital signal corresponding to the number of tracks away from the desired track. The DAC shaper, which can be a conventional digital-to-analog converter and a conventional diode shaping circuit, converts the digital output from the difference counter to an analog signal, shapes it and then directs it to summing junction 19. The tachometer is operatively connected to the carriage and generates a voltage which is proportional to the speed of movement of the carriage. This voltage is applied to the summing junction 19 as a damping voltage. The output voltage from the summing junction equals the position error signal from the shaper as modified by the damping voltage from the tachometer and is applied through summing junction 21 to the motor to drive the carriage. As the head array moves toward the desired track on the disks, the voltage output from the shaper continuously decreases as the counter is decremented. When the read/write heads approach the desired track, the voltage from the summing junction 19 approaches zero and the motor is slowed down. When the voltage reaches zero, the detector circuit 23 detects the zero condition and produces a pulse signal for actuating the switches 22, 35 and 41, indicating that the system is in the on-track condition. If the carriage and the movable grating remain motionless at this point, the voltage signals from amplifiers 30 and 31 would change from alternating signals to fixed voltage level signals. To prevent this, a 60 cycle oscillating signal is provided as an additional input to summing junction 21, causing the motor to reciprocate, so that the read/write heads oscillate about the centerline of the desired track. The amplitude of the oscillation of the heads is small enough that it does not effect the recording or reading of data, but is large enough to produce a detectable alternating voltage signal from each of the sensors 26 and 27. These signals are shown at $V_a$ and $V_b$ respectively. When switch 22 is moved by a pulse from detector 23 the transducer output is connected to summing junction 21 so that voltages $V_a$ and $V_b$ are combined and applied as an error signal to the motor to maintain the mean position of the head array over the selected track centerline as defined by the intersections between $V_a$ and $V_b$. When the switches 35 and 41 are activated by a signal from the detector they are raised to their up position, wherein signals $V_a$ and $V_b$are both applied directly to the summing junction 33, producing an error signal output $V_e$, FIG. 5-4, which is amplified in amplifier 40 and passed through switch 41 to demodulator 39. At the same time, signal $V_b$ is applied to the overdriven amplifier 38 producing a gating waveform $V_g$, FIG. 5-5, which is also applied to the demodulator. The demodulator passes those portions of the signal $V_e$ which occur when the gating signal $V_g$ is in its up condition. This produces an error signal, FIG. 5—6, which is either positive or negative depending upon whether $V_a$ or $V_b$ is larger. This error signal is then amplified in amplifier 42 and fed back to source 34 to allocate current between light sources 24 and 25.

The spacing between adjacent lines on the gratings is a function of the spacing between adjacent tracks on the disk. In the present case the line spacing is one-half of the track spacing, so the line density per inch of grating is twice the track density per inch of disk. The result is that in the combined waveform of FIG. 5 there are twice as many intersections between signals A & B in the waveform as there are tracks, so alternate intersections identify the track locations. This has several inherent advantages over a 1:1 ratio of lines to tracks; e.g., increased accuracy in initial positioning of the head, consistency of polarity of the error signal and use of the linear area of the waveform. It is practical to locate the read/write heads between two adjacent peaks of the combined waveform in the coarse positioning step, so the initial positioning is within ±25 percent of a track centerline The relationship between the two signals A & B of the waveform is consistent at each track-indication intersection, so the relationship of the polarity of the error signal to the direction of correction remains the same for every track. The intersection occurs in the linear region of both signals of the waveform thereby allowing a constant ratio of voltage to distance along the waveform. In order to position the read/write heads accurately the linear regions of the waveform adjacent to the intersections are used. Detection and measurement of distance off track is accomplished by measurement of the voltage level at the particular position on the waveform. This requires a constant relationship between voltage and distance; i.e., volts/milliinch. If a constant ratio of volts/mil is maintained, then the distance off track is immediately deducible from measurement of the voltage value. In order to maintain this relationship the amplitude and the slope of the signals A & B or $V_a$ & $V_b$ are controlled to be equal as discussed in connection with FIG. 4.

By means of the transducer of FIG. 2 and the AGC circuitry of FIG. 4, the system of FIG. 1 is servoed onto the intersection of signals A and B, or $V_a$ and $V_b$, which corresponds to the centerline of the desired track. Since the system is immune to the effects of variations in circuit component characteristics, the read/write heads are constantly maintained in position over the desired track on the disks without the use of servo patterns or a mechanical detent.

While the present invention has been illustrated and described in connection with an access mechanism for a data storage device it is not so limited. It is contemplated that the invention will have general application in connection with servo mechanisms in cases where the requirements of speed, accuracy and reliability are of major significance.

Obviously many modifications and variations of the present invention are possible in the light of the above teachings. It is therefore to be understood that within the scope of the appended claims, the invention may be practiced otherwise than as specifically described.

What we claim is:

1. In an access mechanism for a data storage device which includes a linear actuator operatively connected to an array of read/write heads, apparatus for accurately maintaining the head array in position at a given track location on a rotating recording disk, including:
 a transducer including a fixed grating and a movable grating cooperating with a power source, a pair of light sources, a pair of photoelectric sensors and generating two alternating signals of the same frequency but 180° phase relation for producing a continuous signal indicative of instantaneous position of the head array;
 means for combining the two transducer signals and servoing the head array onto the intersection of the signals; and means for continuously monitoring the signal to maintain a constant ratio of signal strength to increment of displacement of the head array from the track centerline.

2. Apparatus as defined in claim 1 wherein:
 the last-named means include means for summing the amplitudes of the two signals and comparing the sum with a reference to produce an error signal which is applied to the power source to control the power supplied to the light sources.

3. Apparatus as defined in claim 1 wherein:
 the last-named means include means for comparing the gains of the two signals and generating an error signal which is applied to the power source to control the distribution of power between the two light sources.

4. In a servomechanism for positioning a movable member, apparatus for accurately maintaining the member in a position at a given location along the path of movement of the member, including,
 a pair of transducers each including means for producing an alternating signal indicative of movement of the movable member,
 said alternating signals being of equal frequency but out of phase with each other,
 means for comparing the two signals for servoing the movable member to positions related to the intersections of the two signals,
 a summing junction including means to compare the sum of the two signals with a known signal for generating a first error signal,
 a second means for comparing the two signals to generate a second error signal proportional to the algebraic difference between the two signals,
 means for adjusting the transducers in response to the first and second error signals to maintain the amplitude and gain of the transducer signals approximately equal.

5. Apparatus as defined in claim 4 wherein the transducers include a stationary grating and movable gratings fixed to the movable member, and light sources and cooperating photoelectric sensors for generating the alternating signals.

6. In an access mechanism for a data storage device which includes a linear actuator operatively connected to an array of read/write heads, apparatus for accurately maintaining the head array in position at a given track location on a rotating recording disc, including:
 a transducer, which generates two alternating signals of the same frequency but 180° phase relation, including a fixed element and a movable element for producing a continuous signal indicative of the instantaneous position of the head array;
 means for servoing the head array onto the signal; said means including means for combining the two signals and servoing the head array onto the intersection of the signals;
 means for continuously monitoring the signal to maintain a constant ratio of signal strength to increment of displacement of the head array from the track centerline;
 means for applying a small constant frequency oscillation to the mechanism to insure relative movement between the movable and the fixed elements of the transducer at all times.